June 29, 1965  C. L. MEYER  3,192,437
PHOTOSENSITIVE REAR WARNING SIGNAL
Filed Oct. 18, 1961
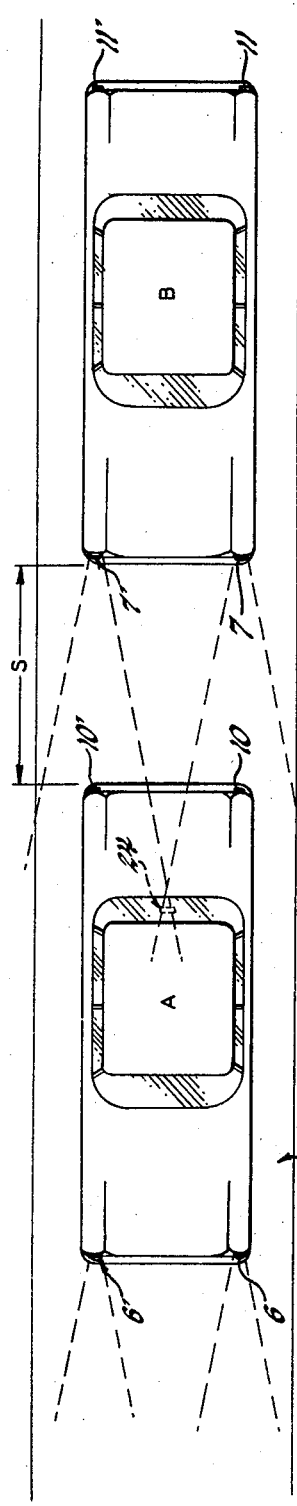
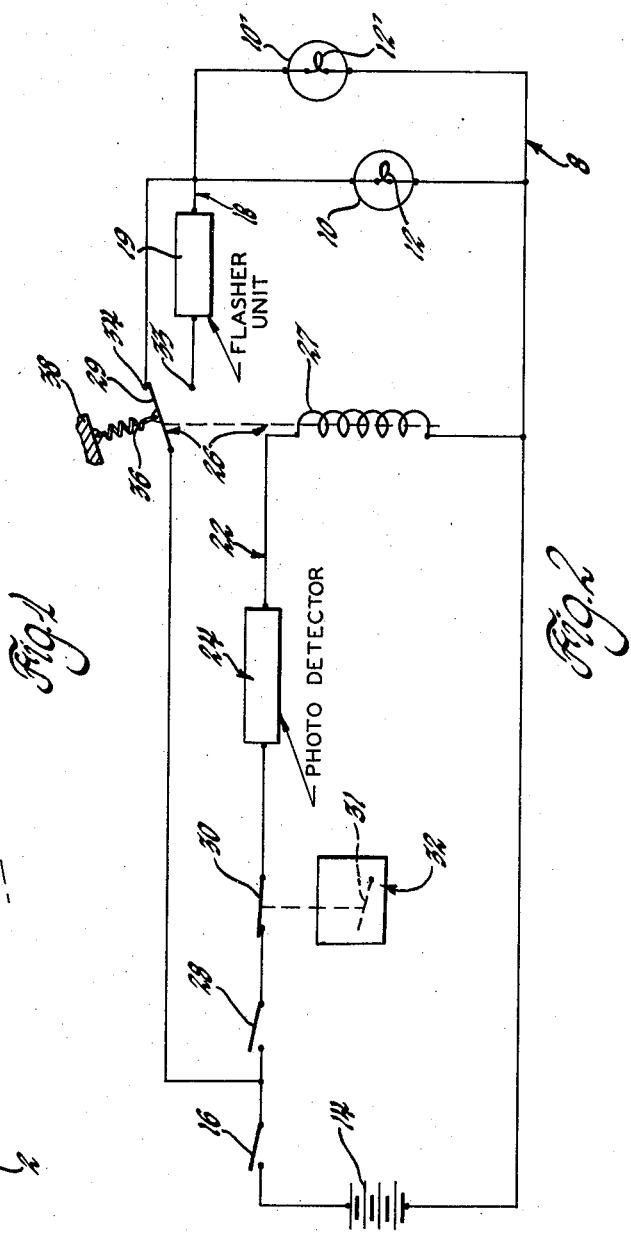
INVENTOR.
Carl L. Meyer
BY
Paul J. Ethington
ATTORNEY 3,192,437
PHOTOSENSITIVE REAR WARNING SIGNAL
Carl L. Meyer, Kokomo, Ind., assignor to General Motors Corporation, Detroit, Mich., a corporation of Delaware
Filed Oct. 18, 1961, Ser. No. 145,882
2 Claims. (Cl. 315—77)

This invention relates to vehicle warning systems and more particularly to a system wherein a warning signal is given by a vehicle notifying the operator of a succeeding vehicle that he is too close for driving safety.

One of the more frequent problems encountered in driving during evening hours on high-speed turnpikes or tollroads is that a vehicle may slow down or even stop unexpectedly. The operator of a succeeding vehicle may not be aware of this until it is too late to slow down and thus must swerve into another lane frequently causing accidents. Accordingly, it is desirable to provide vehicles with a warning system for evening driving so that the operator of a vehicle may be warned when he is too close to a preceding vehicle for driving safety thus providing him with sufficient time in which to slow down.

In accordance with the present invention, a vehicle warning system for evening driving is provided wherein the operator of a vehicle receives a warning signal from a preceding vehicle when the spacing between the vehicles is less than a predetermined safe driving distance. This is accomplished with a system including a rearwardly directed light responsive means mounted on a vehicle and operative to develop a signal quantity corresponding to the intensity of light received from the headlamps of a succeeding vehicle. The signal quantity may be used to energize relay means which in turn may be used to energize an interrupter device connected with the tail light circuit of the vehicle causing its tail lamps to alternately flash on and off thereby warning the operator of the succeeding vehicle that he is too close for driving safety.

A more complete understanding of this invention may be had from the detailed description which follows taken with the accompanying drawings in which:

FIGURE 1 shows an illustrative application of one embodiment of the invention shown in FIGURE 2.

FIGURE 2 is a schematic circuit diagram of one embodiment of the invention.

Referring now to the drawings and more particularly to FIGURE 1, there is shown two vehicles A and B traveling in the same direction on a high speed highway 2 during evening hours, with their respective headlamps 6 and 6' and 7 and 7' and tail lamps 10 and 10' and 11 and 11' turned on. In accordance with this invention, vehicle A is equipped with a warning system including a photo detector 24 preferably mounted on the vehicle behind the rear seat and facing rearwardly so as to intercept light rays propagated from the headlamps of a succeeding vehicle such as B. The detector 24 is designed such that when the spacing between the vehicles is less than a safe driving distance S the intensity of light incident on the detector 24 will exceed a predetermined value at which time the detector 24 will be operative to develop a signal which with appropriate circuit means may be used for causing the tail lamps 10 and 10' to alternately flash on and off warning the operator of vehicle B that he is too close for driving safety. Photodetectors which may be used for this purpose are described and claimed in United States Patent No. 2,829,307, granted on April 1, 1958, in the names of Charles W. Miller and Harold E. Todd and in United States Patent No. 2,935,646, granted on May 3, 1960, in the name of Eugene G. Matkins.

In FIGURE 2, there is shown a vehicle warning system which may be used in conjunction with a vehicle tail light circuit. A tail light circuit 8 comprises tail lamps 10 and 10' connected in parallel and having filaments 12 and 12', respectively, connected in series with a voltage source 14 and an "on-off" light switch 16. The voltage source 14 may be the vehicle's storage battery. A flasher circuit 18, including a flasher unit 19, is connected with the tail light circuit 8. A relay actuated switch 26 is provided comprising a movable armature 29, stationary contacts 33 and 34, and a relay coil 27. The movable armature has one end connected with the positive terminal of the source 14 via the switch 16. The stationary contact 34 is connected with the filaments 12 and 12' and the stationary contact 33 is connected with the flasher circuit 18. A photodetector circuit 22 is connected across the battery 14 in parallel with the tail lamps 10 and 10' and comprises an "on-off" country-town switch 28, a normally closed switch 30 ganged with the switch arm 31 of a turn signal mechanism 32, a photodetector 24 and the relay coil 27. When the relay coil 27 is not energized, the armature 29 is spring biased into contact with the contact 34 by means of a spring 36 coupling the armature 29 with suitable mounting means 38.

The warning system operates as follows: Closing the light switch 16 permits current flow in the tail light circuit 8 from the voltage source 14 through the filaments 12 and 12' of the lamps 10 and 10', respectively. The lamps 10 and 10' will glow continuously unless current flowing in the tail light circuit 8 is interrupted. If the country-town switch 28 is now closed the detector circuit 22 will be closed and operative. When the intensity of light incident on the photodetector 24 exceeds a predetermined level corresponding to a desired safe distance between vehicles for evening driving, the detector 24 will be operative to develop a signal voltage. The relay coil 27 will be energized by the signal voltage and will attract the armature 29, pulling it downwardly against the spring action of spring 36 so as to make contact with the stationary contact 33. This closes the flasher circuit 18 with the tail light circuit 8 and the flasher unit 19 will be operative to alternately interrupt current flow in the tail light circuit 8 causing lamps 10 and 10' to flash on and off warning the operator of the succeeding vehicle that he is too close for driving safety.

In city traffic or other congested areas wherein the speed of vehicles is low compared with that on uncongested highways, the safe distance to be maintained between vehicles for evening driving is less and thus it may be desirable to disconnect the warning system while maintaining the vehicle tail lamps energized. This is accomplished with the country-town switch 28. Opening the switch 28 opens the photodetector circuit 22 rendering the detector 24 inoperative.

It may also be desirable to disconnect the warning system when the operator of a vehicle actuates the vehicle turn signal mechanism since otherwise the on-off flashing of the tail lamp when a succeeding vehicle is too close may be confused with the on-off flashing of the turn signal lamp. This is accomplished with the normally-closed switch 30. When the mechanism 32 is actuated, signalling for either a right or left turn, the normally closed switch 30 will open causing the photodetector circuit 22 to be open circuited rendering the detector 24 inoperative.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:
1. In combination with a vehicle having a rearwardly directed lamp and a voltage source, a warning system for indicating to the operator of a succeeding vehicle that he is too close for driving safety and comprising an electromagnetic relay including an armature, a switch having a movable contact and first and second stationary contacts, said movable contact being actuable by said armature, circuit means connecting the movable contact with the source, circuit means including a flasher unit connecting the first stationary contact with the lamp, circuit means connecting the second stationary contact with the lamp, and light responsive means on said vehicle and positioned to receive light from the headlights of a succeeding vehicle, said light responsive means connected with the source for developing a signal quantity corresponding to the intensity of light received from the headlamps of a succeeding vehicle, the relay actuated switch including a relay coil connected with the light responsive means for energization thereby and for actuating the movable contact so as to selectively connect the movable contact with the first and second stationary contacts to respectively alternately or constantly energize the lamp when the intensity of light received from a succeeding vehicle is respectively above or below a predetermined value.

2. In combination with a vehicle having a rearwardly directed lamp and a voltage source, a warning system for indicating to the operator of a succeeding vehicle that he is too close for driving safety and comprising a relay including a coil and an armature, circuit means connecting the armature with the source, first and second contacts alternately engageable by the armature, circuit means including a flasher unit connecting the first contact with the lamp, circuit means connecting the second contact with the lamp, light responsive means connected with the source for developing a signal quantity in response to the intensity of light received from the headlamps of a succeeding vehicle, the coil being connected with the light responsive means for energization thereby and for actuating the armature so as to selectively connect the armature with the first and second contacts to respectively alternately or constantly energize the lamp when the intensity of light received from a succeeding vehicle is respectively above or below a predetermined value, a first switch connected in series with the lamp for interrupting current flow therein, and a second switch connected in series with the coil for interrupting energization thereof.

References Cited by the Examiner
UNITED STATES PATENTS

| 1,785,397 | 12/30 | Shoenberg et al. | 340—72 |
| 2,562,271 | 7/51 | Hollins | 340—72 X |
| 2,786,962 | 3/57 | Woodward | 315—83.1 |
| 2,825,851 | 3/58 | Lidiak | 315—83.1 |
| 2,963,693 | 12/60 | Capalozzi | 340—34 X |
| 2,974,304 | 3/61 | Nordlund | 340—24 |
| 3,002,127 | 9/61 | Grontkowski | 340—81 X |
| 3,026,498 | 3/62 | Galliers | 340—104 |

NEIL C. READ, *Primary Examiner.*
BENNETT G. MILLER, *Examiner.*